(12) United States Patent
Liu

(10) Patent No.: US 11,697,428 B2
(45) Date of Patent: Jul. 11, 2023

(54) METHOD AND APPARATUS FOR 3D MODELING

(71) Applicant: APOLLO INTELLIGENT DRIVING TECHNOLOGY (BEIJING) CO., LTD., Beijing (CN)

(72) Inventor: Yiming Liu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 127 days.

(21) Appl. No.: 17/118,440

(22) Filed: Dec. 10, 2020

(65) Prior Publication Data
US 2021/0403026 A1 Dec. 30, 2021

(30) Foreign Application Priority Data
Jun. 29, 2020 (CN) .......................... 202010605153.4

(51) Int. Cl.
*B60W 60/00* (2020.01)
*G06F 18/213* (2023.01)
*G06V 20/58* (2022.01)

(52) U.S. Cl.
CPC ......... *B60W 60/001* (2020.02); *G06F 18/213* (2023.01); *G06V 20/58* (2022.01); *B60W 2554/4049* (2020.02)

(58) Field of Classification Search
CPC ........ B60W 60/001; B60W 2554/4049; G06V 20/58; G06F 18/213; G06K 9/6232; G06T 15/00; G06T 15/20; G06T 15/205
See application file for complete search history.

(56) References Cited

U.S. PATENT DOCUMENTS 6,501,536 B1 * 12/2002 Fredricks .......... B60R 21/01556
356/138
7,375,728 B2 * 5/2008 Donath ..................... B60R 1/00
348/118
10,999,559 B1 * 5/2021 Pertsel ................. G06V 10/267
11,190,757 B2 * 11/2021 Lynch .................... H04N 13/30
2003/0128182 A1 7/2003 Donath et al.
2003/0135342 A1 * 7/2003 Englander ................ B60R 1/02
702/116

(Continued)

FOREIGN PATENT DOCUMENTS

CN 102378998 A 3/2012
CN 108082083 A 5/2018

(Continued)

OTHER PUBLICATIONS

Japanese Office Action dated May 10, 2022 for Japanese Patent Application No. 2021-053237.

(Continued)

*Primary Examiner* — Peter D Nolan
*Assistant Examiner* — Kenneth M Dunne
(74) *Attorney, Agent, or Firm* — Knobbe, Martens, Olson & Bear, LLP

(57) ABSTRACT

A method for three-dimensional modeling. The method may include: acquiring coordinate points of obstacles in a surrounding environment of an autonomous driving vehicle in a vehicle coordinate system; determining a position of eyes of a passenger in the autonomous driving vehicle, and establishing an eye coordinate system using the position of the eyes as a coordinate origin; converting the coordinate points of the obstacles in the vehicle coordinate system to coordinate points in the eye coordinate system, and determining a visualization distance between the obstacles in the surrounding environment based on an observation angle of the eyes; and performing three-dimensional modeling of the surrounding environment, based on visualization distance between the coordinate points of the obstacles in the eye coordinate system and the obstacles.

12 Claims, 5 Drawing Sheets

(56) References Cited

U.S. PATENT DOCUMENTS

| | | | |
|---|---|---|---|
| 2004/0032418 A1* | 2/2004 | Cosman | G06T 17/00 |
| | | | 345/419 |
| 2004/0066376 A1* | 4/2004 | Donath | G01C 21/365 |
| | | | 345/169 |
| 2007/0070197 A1 | 3/2007 | Akatsuka et al. | |
| 2013/0282345 A1* | 10/2013 | McCulloch | G06G 7/48 |
| | | | 703/6 |
| 2015/0077562 A1 | 3/2015 | Heckel et al. | |
| 2016/0210735 A1* | 7/2016 | Fukushima | G06T 7/77 |
| 2018/0194285 A1* | 7/2018 | Herrmann | G06V 20/58 |

FOREIGN PATENT DOCUMENTS

| | | |
|---|---|---|
| CN | 110619303 A | 12/2019 |
| JP | 2008076310 | 4/2008 |
| JP | 2012025327 A | 2/2012 |
| JP | 2014044569 A | 3/2014 |
| JP | 2015210584 A | 11/2015 |
| KR | 20140114373 | 9/2014 |
| WO | WO 2013081287 | 6/2013 |
| WO | WO 2018094932 A1 | 5/2018 |

OTHER PUBLICATIONS

May 17, 2022 Office Action from European App. No. 21165229.2 (6 pgs).
Korean Office Action dated Feb. 18, 2022 for Korean Patent Application No. 10-2021-0040406.
Extended European Search Report dated Aug. 25, 2021 for European Patent Application No. 21165229.2. 9 pages.

* cited by examiner

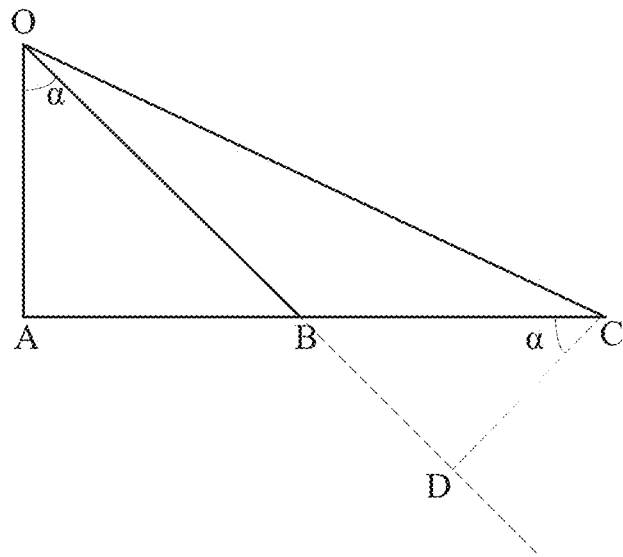

401
Performing three-dimensional modeling of the reference obstacle based on the coordinate point of the reference obstacle in the eye coordinate system 402
Determining a position of the other obstacle using the visualization distance between the other obstacle except the reference obstacle in the target area and the reference obstacle 403
Performing three-dimensional modeling of the other obstacle using the position of the other obstacle

Fig. 4

METHOD AND APPARATUS FOR 3D MODELING

CROSS-REFERENCE TO RELATED APPLICATIONS

This patent application claims the priority to Chinese Patent Application No. 202010605153.4, filed on Jun. 29, 2020, and entitled "Method and apparatus for 3D modeling," the disclosure of which is hereby incorporated by reference in its entirety.

TECHNICAL FIELD

Embodiments of the present disclosure relate to the field of computer technology, specifically to the field of intelligent transportation and autonomous driving.

BACKGROUND

An autonomous driving vehicle is a type of intelligent vehicle, also known as a wheeled mobile robot, which mainly relies on a smart pilot based on a computer system in the vehicle, to achieve the purpose of autonomous driving. At present, autonomous driving vehicles usually project their perception of the surrounding environment onto on-board screens to enhance passengers' trust in the vehicles' perception capabilities. Therefore, how to perform three-dimensional (3D) modeling of the surrounding environment of the autonomous driving vehicles so that the surrounding environment of the autonomous driving vehicles seen by the passengers through the screens is closer to the surrounding environment seen through vehicle windows is a problem to be solved urgently.

SUMMARY

Embodiments of the present disclosure provide a method and apparatus for three-dimensional modeling.

According to a first aspect, an embodiment of the present disclosure provides a method for three-dimensional modeling, the method including: acquiring coordinate points of obstacles in a surrounding environment of an autonomous driving vehicle in a vehicle coordinate system; determining a position of eyes of a passenger in the autonomous driving vehicle, and establishing an eye coordinate system using the position of the eyes as a coordinate origin; converting the coordinate points of the obstacles in the vehicle coordinate system to coordinate points in the eye coordinate system, and determining a visualization distance between the obstacles in the surrounding environment based on an observation angle of the eyes; and performing three-dimensional modeling of the surrounding environment, based on visualization distance between the coordinate points of the obstacles in the eye coordinate system and the obstacles.

According to a second aspect, an embodiment of the present disclosure provides an apparatus for three-dimensional modeling, the apparatus including: an acquisition unit, configured to acquire coordinate points of obstacles in a surrounding environment of an autonomous driving vehicle in a vehicle coordinate system; an establishing unit, configured to determine a position of eyes of a passenger in the autonomous driving vehicle, and establish an eye coordinate system using the position of the eyes as a coordinate origin; a determination unit, configured to convert the coordinate points of the obstacles in the vehicle coordinate system to coordinate points in the eye coordinate system, and determine a visualization distance between the obstacles in the surrounding environment based on an observation angle of the eyes; and a modeling unit, configured to perform three-dimensional modeling of the surrounding environment, based on visualization distance between the coordinate points of the obstacles in the eye coordinate system and the obstacles.

According to a third aspect, an embodiment of the present disclosure provides an electronic device, including: at least one processor; and a memory, communicatively connected to the at least one processor. The memory stores instructions executable by the at least one processor, the instructions, when executed by the at least one processor, cause the at least one processor to perform any method according to the first aspect.

According to a fourth aspect, an embodiment of the present disclosure provides a non-transitory computer readable storage medium, storing computer instructions, the computer instructions, being used to cause the computer to perform any method according to the first aspect.

According to the technology of some embodiments of the present disclosure, first acquiring coordinate points of obstacles in a surrounding environment of an autonomous driving vehicle in a vehicle coordinate system; then determining a position of eyes of a passenger in the autonomous driving vehicle, and establishing an eye coordinate system using the position of the eyes as a coordinate origin; then converting the coordinate points of the obstacles in the vehicle coordinate system to coordinate points in the eye coordinate system, and determining a visualization distance between the obstacles in the surrounding environment based on an observation angle of the eyes; and finally performing three-dimensional modeling of the surrounding environment, based on visualization distance between the coordinate points of the obstacles in the eye coordinate system and the obstacles. Using this method, the distance between the obstacles in the surrounding environment under the observation angle of the eyes may be determined, so that the surrounding environment of the autonomous driving vehicle seen by a passenger through an on-board screen is closer to the surrounding environment seen through the vehicle window.

It should be understood that the content described in this section is not intended to identify key or important features of embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the present solution and do not constitute a limitation to the present disclosure.

FIG. 3 is a schematic diagram of coordinate points of obstacles in an eye coordinate system in the method for three-dimensional modeling according to an embodiment of the present disclosure;

FIG. 4 is a flowchart of three-dimensional modeling of a surrounding environment in the method for three-dimensional modeling according to an embodiment of the present disclosure;

DETAILED DESCRIPTION OF EMBODIMENTS

The following describes example embodiments of the present disclosure in conjunction with accompanying drawings, which includes various details of embodiments of the present disclosure to facilitate understanding, and they should be considered as merely as examples. Therefore, those of ordinary skill in the art should recognize that various changes and modifications may be made to the embodiments described herein without departing from the scope and spirit of the present disclosure. Also, for clarity and conciseness, descriptions of well-known functionalities and structures are omitted in the following description.

Figure 1:
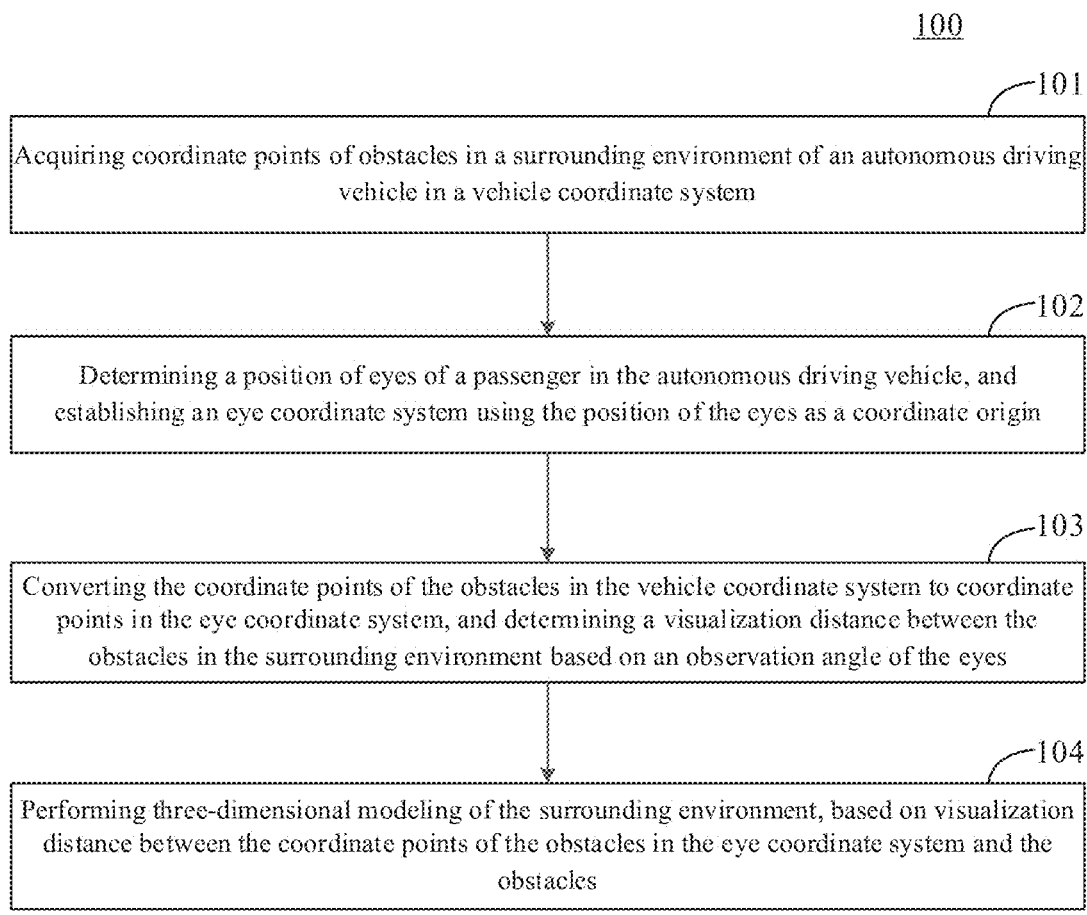
FIG. 1 is a flowchart of a method for three-dimensional modeling according to an embodiment of the present disclosure.

FIG. 1 illustrates a flow 100 of a method for three-dimensional modeling according to an embodiment of the present disclosure. The method for three-dimensional modeling includes the following steps.

Step 101, acquiring coordinate points of obstacles in a surrounding environment of an autonomous driving vehicle in a vehicle coordinate system.

In the present embodiment, an executing body of the method for three-dimensional modeling (for example, an on-board terminal device of the autonomous driving vehicle) may acquire the coordinate points of the obstacles in the surrounding environment of the autonomous driving vehicle in the vehicle coordinate system. The autonomous driving vehicle may be equipped with sensors such as an on-board camera and a lidar. These sensors may perceive the surrounding environment of the autonomous driving vehicle, acquire spatial coordinates of various obstacles in the surrounding environment, merge the spatial coordinates of the obstacles acquired by the sensors using a pre-calibrated vehicle coordinate system, to obtain the coordinate points of the obstacles in the vehicle coordinate system of the autonomous driving vehicle. The vehicle coordinate system may be a coordinate system using the center point of the autonomous driving vehicle as a coordinate origin. The vehicle coordinate system may use the driving direction of the autonomous driving vehicle as the X coordinate axis or the Y coordinate axis.

The obstacles in the above surrounding environment may include, but are not limited to: vehicles, pedestrians, buildings, trees, and roadblock facilities.

Step 102, determining a position of eyes of a passenger in the autonomous driving vehicle, and establishing an eye coordinate system using the position of the eyes as a coordinate origin.

In the present embodiment, the executing body may determine the position of the eyes of the passenger in the autonomous driving vehicle. The autonomous driving vehicle may be equipped with an eye sensing device (for example, an in-vehicle camera and an infrared sensing apparatus), perceive the eyes of the passenger using the eye sensing device, to determine the position of the eyes. Then, the executing body may establish the eye coordinate system using the position of the eyes as the coordinate origin. The X coordinate axis or the Y coordinate axis of the eye coordinate system may be the driving direction of the autonomous driving vehicle.

Step 103, converting the coordinate points of the obstacles in the vehicle coordinate system to coordinate points in the eye coordinate system, and determining a visualization distance between the obstacles in the surrounding environment based on an observation angle of the eyes.

In the present embodiment, the executing body may convert the coordinate points of the obstacles in the vehicle coordinate system to the coordinate points in the eye coordinate system. Here, the executing body may use one-to-one corresponding relationship between the coordinate points of the vehicle coordinate system and the eye coordinate system to perform coordinate conversion through operations such as translation or rotation of a coordinate axis.

For example, if the coordinate points of obstacle A in the vehicle coordinate system is (3, 3, 3), and the coordinate points of the eyes in the vehicle coordinate system is (1, 1, 1), in this regard, if the position of the eyes (1, 1, 1) is used as the coordinate origin of the eye coordinate system, a new coordinate points of obstacle A in the eye coordinate system is (2, 2, 2).

Then, the executing body may determine the visualization distance between the obstacles in the surrounding environment based on the observation angle of the eyes. Visualization is a theory, method and technology of using computer graphics and image processing technology to convert data into graphics or images and display the graphics or images on a screen, and then perform interactive processing. Here, the visualization distance may be distance based on when images of the obstacles in the surrounding environment are displayed on the on-board screen. If an obstacle needs to be displayed on the on-board screen, the position of the obstacle in the surrounding environment may be determined by zooming the visualization distance in a certain proportion.

Step 104, performing three-dimensional modeling of the surrounding environment, based on visualization distance between the coordinate points of the obstacles in the eye coordinate system and the obstacles.

In the present embodiment, the executing body may perform three-dimensional modeling of the surrounding environment, based on the visualization distance between the coordinate points of the obstacles in the eye coordinate system and the obstacles. Here, the executing body may determine the position of each obstacle in the surrounding environment through the distance between the obstacle and the eyes and the distance between the obstacles, so as to perform three-dimensional modeling of the surrounding environment.

It should be noted that since the passenger is sitting in the autonomous driving vehicle, the distance between the obstacle and the passenger's eyes may also be considered as the distance between the obstacle and the autonomous driving vehicle.

In the present embodiment, after performing three-dimensional modeling of the surrounding environment, the executing body may render the modeled surrounding environment. Rendering may be a stage of making an image fit a 3D scene.

In the present embodiment, three-dimensional modeling may also be referred to as 3D modeling, which generally refers to using three-dimensional production software to construct a model having three-dimensional data through a virtual three-dimensional space. 3D modeling may include two modeling methods of NURBS (Non-Uniform Rational B-Splines) and polygon mesh. NURBS is a very good modeling method, which is supported in advanced three-dimensional software. Polygon mesh is a collection of vertices, edges and sides that constitute a 3D object, defining the shape and outline of each 3D character and object. Each vertex in the polygon mesh stores x, y, and z coordinate information. NURBS can better control the curvature of an object surface than a traditional mesh modeling method, so as to create a more realistic and vivid modeling.

The method provided by the above embodiment of the present disclosure may determine the distance of the obstacles in the surrounding environment under the observation angle of the eyes, so that the surrounding environment of the autonomous driving vehicle seen by a passenger through an on-board screen is closer to the surrounding environment seen through the car window.

In some alternative implementations of the present embodiment, the executing body may determine the visualization distance between the obstacles in the surrounding environment based on the observation angle of the eyes as follows: the executing body may select a target area from the surrounding environment. The target area may be a pre-planned area, for example, the target area may be an area within 50 meters in front of or behind the autonomous driving vehicle, or an area within 50 meters of the left or right side of the autonomous driving vehicle, or the entire surrounding environment may alternatively be used as the target area. Then, the executing body may determine a visualization distance between obstacles in the target area. Specifically, the executing body may select a target obstacle from the obstacles in the target area, for example, any obstacle may be selected from the obstacles in the target area as the target obstacle, or an obstacle closest to the coordinate origin of the eye coordinate system may be selected from the obstacles in the target area as the target obstacle.

Then, a visualization distance determination step may be performed as follows based on the target obstacle: a visualization distance between an obstacle closest to the target obstacle (a first obstacle) and the target obstacle in the target area may be determined. Here, the coordinate origin of the eye coordinate system may be used as the center of a circle and a distance from the coordinate origin to the first obstacle is used as the radius to make the circle. Using the coordinate origin as the starting point and an intersection of a ray passing through a coordinate point of the target obstacle and the circle as a target point, the distance of the line between the target point and the coordinate point of the first obstacle may be determined as the visualization distance between the first obstacle and the target obstacle. Then, it may be determined whether there is an obstacle in the target area whose visualization distance has not been determined.

If there is an obstacle for which the visualization distance has not been determined, the obstacle for which the visualization distance has not been determined may be used as the target obstacle, and the above visualization distance determination step may proceed.

This embodiment provides a method for calculating the visualization distance, so as to enrich the method of calculating the visualization distance.

Figure 2:
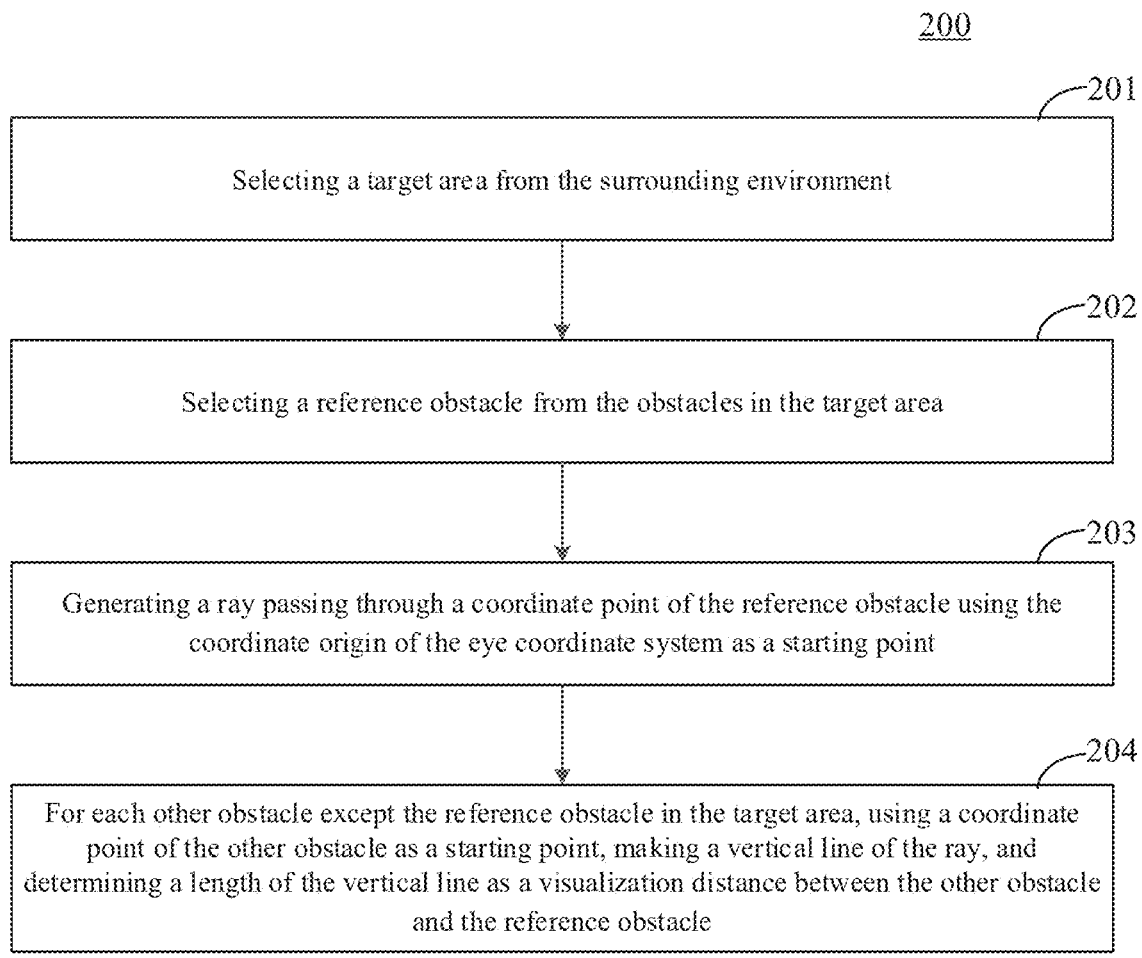
FIG. 2 is a flowchart of determining a visualization distance between obstacles in the method for three-dimensional modeling according to an embodiment of the present disclosure.

With further reference to FIG. 2, a flow 200 of determining a visualization distance between obstacles in the method for three-dimensional modeling according to an embodiment of is illustrated. The flow 200 of determining a visualization distance between obstacles includes the following steps.

Step 201, selecting a target area from the surrounding environment.

In the present embodiment, the executing body of the method for three-dimensional modeling (for example, the on-board terminal device of the autonomous driving vehicle) may select the target area from the surrounding environment. The target area may be a pre-planned area, for example, the target area may be an area within 50 meters in front of or behind the autonomous driving vehicle, or an area within 50 meters of the left or right side of the autonomous driving vehicle, or the entire surrounding environment may alternatively be used as the target area.

Step 202, selecting a reference obstacle from the obstacles in the target area.

In the present embodiment, the executing body may select the reference obstacle from the obstacles in the target area. For example, an obstacle closest to the autonomous driving vehicle may be selected from the obstacles in the target area as the reference obstacle.

Step 203, generating a ray passing through a coordinate point of the reference obstacle using the coordinate origin of the eye coordinate system as a starting point.

In the present embodiment, the executing body may generate the ray passing through the coordinate point of the reference obstacle using the coordinate origin of the eye coordinate system as the starting point.

As shown in FIG. 3, FIG. 3 shows a schematic diagram of coordinate points of obstacles in an eye coordinate system in the method for three-dimensional modeling according to an embodiment of the present disclosure. In FIG. 3, the coordinate origin of the eye coordinate system is O, OA is a line segment perpendicular to the on-board screen of the autonomous driving vehicle, point B is the coordinate point of reference obstacle B, and point C is the coordinate point of obstacle C. The executing body may use the coordinate origin of the eye coordinate system O as the starting point to generate a ray passing through the coordinate point B of the reference obstacle, i.e., the ray OD as shown in FIG. 3.

Step 204, for each other obstacle in the target area except the reference obstacle, using a coordinate point of the other obstacle as a starting point, making a vertical line of the ray, and determining a length of the vertical line as a visualization distance between the other obstacle and the reference obstacle.

In the present embodiment, for each other obstacle in the target area except the reference obstacle, the executing body may use the coordinate point of the other obstacle as the starting point, make the vertical line of the ray, and determine the length of the vertical line as the visualization distance between the other obstacle and the reference obstacle.

As shown in FIG. 3, for obstacle C, the coordinate point C of obstacle C is used as the starting point and the vertical line of the ray OD is drawn to obtain the vertical line CD. The length of the vertical line CD may be determined as the visualization distance between obstacle C and reference obstacle B. Here, assuming that an angle between the line segment OB and the line segment OA is $\alpha$, then an angle between the line segment CD and the line segment CB is also $\alpha$. Since the length of the line segment CB is known, through the trigonometric function relationship, the line segment $CD = \cos \alpha \times CB$ may be determined.

The method provided by the above embodiment of the present disclosure provides another method for calculating the visualization distance. This method for calculating the visualization distance may more accurately determine the visualization distance between the other obstacle and the reference obstacle.

With further reference to FIG. 4, illustrating a flow 400 of three-dimensional modeling of a surrounding environment in the method for three-dimensional modeling according to an embodiment. The flow 400 of performing three-dimensional modeling of the surrounding environment includes the following steps.

Step 401, performing three-dimensional modeling of the reference obstacle based on the coordinate point of the reference obstacle in the eye coordinate system.

In the present embodiment, the executing body of the method for three-dimensional modeling (for example, the on-board terminal device of the autonomous driving vehicle) may perform three-dimensional modeling of the reference obstacle based on the coordinate point of the reference obstacle in the eye coordinate system. Specifically, the executing body may determine a relative positional relationship between the reference obstacle and the autonomous driving vehicle through the coordinate point of the reference obstacle in the eye coordinate system, so as to perform three-dimensional modeling of the reference obstacle. It should be noted that in order to better present a relative positional relationship of the surrounding environment, three-dimensional modeling of the autonomous driving vehicle is also required.

Here, after performing three-dimensional modeling of the reference obstacle, the executing body may render the modeled reference obstacle. Rendering may be a stage of making an image fit a 3D scene.

Step 402, determining a position of the other obstacle using the visualization distance between the other obstacle except the reference obstacle in the target area and the reference obstacle.

In the present embodiment, the executing body may determine the position of the other obstacle using the visualization distance between the other obstacle in the target area except the reference obstacle and the reference obstacle. Here, the executing body may determine a relative orientational relationship between the other obstacle and the reference obstacle through coordinate points of the other obstacle and the reference obstacle in the eye coordinate system. The executing body may keep the relative orientation relationship between the other obstacle and the reference obstacle unchanged, and translate the other obstacle in the direction of the reference obstacle until the distance between the other obstacle and the reference obstacle is the visualization distance, and determine the position as the position of the other obstacle.

Step 403, performing three-dimensional modeling of the other obstacle using the position of the other obstacle.

In the present embodiment, the executing body may perform three-dimensional modeling of the other obstacle at the position of the other obstacle. After performing three-dimensional modeling of the other obstacle, the executing body may render the modeled other obstacle.

The method provided by the above embodiment of the present disclosure may use the reference obstacle as a reference to determine the positional relationship of the other obstacle, so as to avoid the orientation of the other obstacle being affected by an error in the position of an obstacle.

In some alternative implementations of the present embodiment, the executing body may perform three-dimensional modeling of the reference obstacle based on the coordinate point of the reference obstacle in the eye coordinate system through the following steps.

Step one, determining a visualization distance between the eyes and the reference obstacle, based on the visualization distance between the other obstacle and the reference obstacle, a real distance between the other obstacle and the reference obstacle, and a real distance between the eyes and the reference obstacle.

Here, for each other obstacle in the target area except the reference obstacle, assuming that the visualization distance between the other obstacle and the reference obstacle is a', the real distance between the other obstacle and the reference obstacle is a, the real distance between the eyes and the reference obstacle is c, and the visualization distance between the eyes and the reference obstacle is c'. Through the visual proportional relationship a'/a=c'/c, it may be obtained that c'=c×a'/a. Since the visualization distance a' between the other obstacle and the reference obstacle, the real distance a between the other obstacle and the reference obstacle, and the real distance c between the eyes and the reference obstacle are known, the visualization distance c' between the eyes and the reference obstacle may be determined by the above formula c'=c×a'/a based on the other obstacle.

If the number of the other obstacles is at least two, the executing body may use the at least two other obstacles as the basis to perform a weighted average calculation on obtained at least two visualization distances between the eyes and the reference obstacle, to obtain the visualization distance between the eyes and the reference obstacle.

It should be noted that since the passenger is sitting in the autonomous driving vehicle, the distance between the obstacle and the passenger's eyes may also be considered as the distance between the obstacle and the autonomous driving vehicle.

Step two, determining a position of the reference obstacle using the coordinate point of the reference obstacle in the eye coordinate system and the visualization distance between the eyes and the reference obstacle.

Here, the executing body may determine a relative orientation relationship between the reference obstacle and the eyes using the coordinate point of the reference obstacle in the eye coordinate system. Then, the executing body may keep the relative orientation relationship between the reference obstacle and the eyes unchanged, and translate the reference obstacle in the direction of the eyes until the distance between the reference obstacle and the eyes is the visualization distance between the reference obstacle and the eyes, and determine the position as the position of the reference obstacle.

It should be noted that after the reference obstacle is translated in the direction of the eyes, in order to ensure the relative position relationship between the obstacles, the other obstacle also needs to be translated in the direction of the eyes accordingly.

Step three, performing three-dimensional modeling of the reference obstacle using the position of the reference obstacle.

Here, the executing body may perform three-dimensional modeling of the reference obstacle at the position of the reference obstacle. After performing three-dimensional modeling of the reference obstacle, the executing body may render the modeled reference obstacle.

Using this method, the visualization distance between the eyes and the reference obstacle may be obtained by comprehensive calculation through the visual proportional relationship and based on a plurality of other obstacles. Therefore, the visualization distance between the eyes and the reference obstacle may be determined more accurately and reasonably.

In some alternative implementations of the present embodiment, the executing body may select a target area from the surrounding environment as follows: the executing body may divide the surrounding environment. Generally speaking, the more areas divided, the more accurate the visualization distance determined in each area. Then, any area may be selected as the target area from the divided areas. By dividing the surrounding environment, the visualization distance between obstacles in the area may be determined for each target area that is divided, so that the visualization distance may be determined more accurately.

Figure 5:
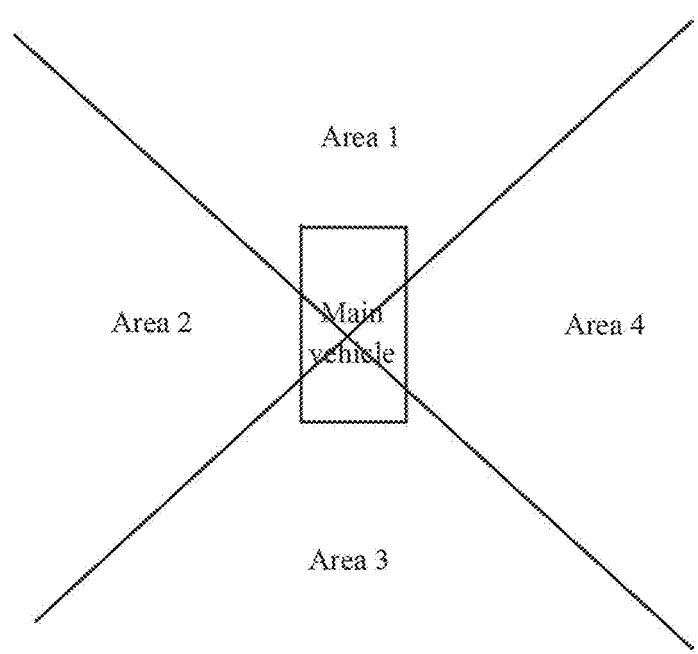
FIG. 5 is a schematic diagram of divided areas in the method for three-dimensional modeling according to an embodiment of the present disclosure.

As shown in FIG. 5, FIG. 5 shows a schematic diagram of divided areas in the method for three-dimensional modeling according to an embodiment of the present disclosure. In FIG. 5, the surrounding environment may be divided into 4 areas. Area 1 includes the front, part of the left area and part of the right area of the autonomous driving vehicle. Area 2 includes the left side, part of the front area and part of the rear area of the autonomous driving vehicle. Area 3 includes the rear, part of the left area and part of the right area of the autonomous driving vehicle. Area 4 includes the right side, part of the front area and part of the rear area of the autonomous driving vehicle.

Figure 6:
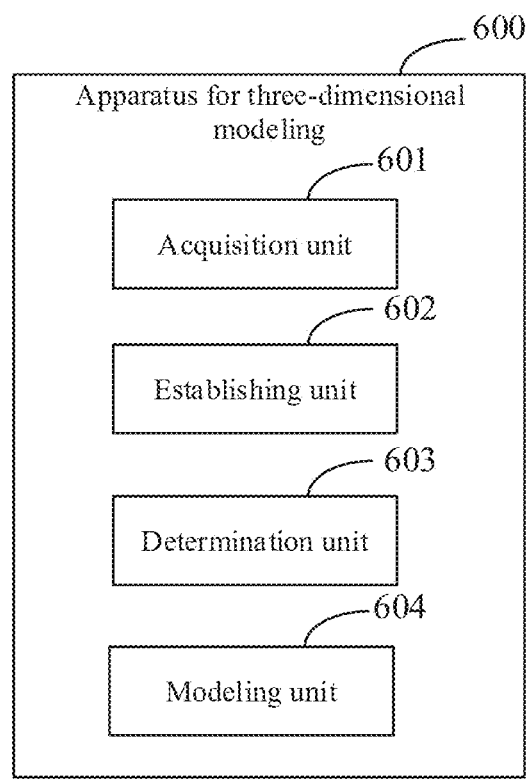
FIG. 6 is a schematic structural diagram of an apparatus for three-dimensional modeling according to an embodiment of the present disclosure.

With further reference to FIG. 6, as an implementation of the method shown in the above figures, the present disclosure provides an apparatus for three-dimensional modeling according to an embodiment, and the apparatus embodiment corresponds to the method embodiment as shown in FIG. 1. The apparatus may be specifically applied to various electronic devices.

As shown in FIG. 6, an apparatus 600 for three-dimensional modeling of the present embodiment includes: an acquisition unit 601, an establishing unit 602, a determination unit 603 and a modeling unit 604. The acquisition unit 601 is configured to acquire coordinate points of obstacles in a surrounding environment of an autonomous driving vehicle in a vehicle coordinate system. The establishing unit 602 is configured to determine a position of eyes of a passenger in the autonomous driving vehicle, and establish an eye coordinate system using the position of the eyes as a coordinate origin. The determination unit 603 is configured to convert the coordinate points of the obstacles in the vehicle coordinate system to coordinate points in the eye coordinate system, and determine a visualization distance between the obstacles in the surrounding environment based on an observation angle of the eyes. The modeling unit 604 is configured to perform three-dimensional modeling of the surrounding environment, based on visualization distance between the coordinate points of the obstacles in the eye coordinate system and the obstacles.

In the present embodiment, for the specific processing and the technical effects thereof of the acquisition unit 601, the establishing unit 602, the determination unit 603 and the modeling unit 604 of the apparatus 600 for three-dimensional modeling, reference may be made to the relevant descriptions of steps 101-104 in the embodiment corresponding to FIG. 1 respectively, and detailed description thereof will be omitted.

In some alternative implementations of the present embodiment, the determination unit 603 may be further configured to determine a visualization distance between the obstacles in the surrounding environment based on an observation angle of the eyes as follows: the determination unit 603 may select a target area from the surrounding environment. The target area may be a pre-planned area, for example, the target area may be an area within 50 meters in front of or behind the autonomous driving vehicle, or an area within 50 meters of the left or right side of the autonomous driving vehicle, or the entire surrounding environment may alternatively be used as the target area. Then, the determination unit 603 may determine a visualization distance between obstacles in the target area. Specifically, the determination unit 603 may select a target obstacle from the obstacles in the target area, for example, any obstacle may be selected from the obstacles in the target area as the target obstacle, or an obstacle closest to the coordinate origin of the eye coordinate system may be selected from the obstacles in the target area as the target obstacle.

Then, a visualization distance determination step may be performed as follows based on the target obstacle: a visualization distance between an obstacle closest to the target obstacle (a first obstacle) and the target obstacle in the target area may be determined. Here, the coordinate origin of the eye coordinate system may be used as the center of a circle and a distance from the coordinate origin to the first obstacle is used as the radius to make the circle. Using the coordinate origin as the starting point and an intersection of a ray passing through a coordinate point of the target obstacle and the circle as a target point, the distance of the line between the target point and the coordinate point of the first obstacle may be determined as the visualization distance between the first obstacle and the target obstacle. Then, it may be determined whether there is an obstacle in the target area whose visualization distance has not been determined.

If there is an obstacle for which the visualization distance has not been determined, the obstacle for which the visualization distance has not been determined may be used as the target obstacle, and the above visualization distance determination step may proceed.

This embodiment provides a method for calculating the visualization distance, so as to enrich the method of calculating the visualization distance.

In some alternative implementations of the present embodiment, the determination unit 603 may select a reference obstacle from the obstacles in the target area. For example, an obstacle closest to the autonomous driving vehicle may be selected from the obstacles in the target area as the reference obstacle. Then, the determination unit 603 may generate a ray passing through a coordinate point of the reference obstacle using the coordinate origin of the eye coordinate system as a starting point. For each other obstacle in the target area except the reference obstacle, the determination unit 603 may use a coordinate point of the other obstacle as a starting point, make a vertical line of the ray, and may determine a length of the vertical line as a visualization distance between the other obstacle and the reference obstacle.

In some alternative implementations of the present embodiment, the modeling unit 604 may perform three-dimensional modeling of the reference obstacle based on the coordinate point of the reference obstacle in the eye coordinate system. Specifically, the modeling unit 604 may determine a relative positional relationship between the reference obstacle and the autonomous driving vehicle through the coordinate point of the reference obstacle in the eye coordinate system, so as to perform three-dimensional modeling of the reference obstacle. It should be noted that in order to better present a relative positional relationship of the surrounding environment, three-dimensional modeling of the autonomous driving vehicle is also required.

Then, the modeling unit 604 may determine a position of the other obstacle using the visualization distance between the other obstacle except the reference obstacle in the target area and the reference obstacle. Here, the modeling unit 604 may determine a relative orientation relationship between the other obstacle and the reference obstacle through coordinate points of the other obstacle and the reference obstacle in the eye coordinate system. The modeling unit 604 may keep the relative orientation relationship between the other obstacle and the reference obstacle unchanged, and translate the other obstacle in the direction of the reference obstacle until the distance between the other obstacle and the reference obstacle is the visualization distance, and determine the position as the position of the other obstacle.

Finally, the modeling unit 604 may perform three-dimensional modeling of the other obstacle at the position of the other obstacle. After performing three-dimensional modeling of the other obstacle, the modeling unit 604 may render the modeled other obstacle.

In some alternative implementations of the present embodiment, the modeling unit 604 may perform three-dimensional modeling of the reference obstacle based on the coordinate point of the reference obstacle in the eye coordinate system through the following steps.

Step one, determining a visualization distance between the eyes and the reference obstacle, based on the visualization distance between the other obstacle and the reference obstacle, a real distance between the other obstacle and the reference obstacle, and a real distance between the eyes and the reference obstacle.

Here, for each other obstacle in the target area except the reference obstacle, assuming that the visualization distance between the other obstacle and the reference obstacle is $a'$, the real distance between the other obstacle and the reference obstacle is $a$, the real distance between the eyes and the reference obstacle is $c$, and the visualization distance between the eyes and the reference obstacle is $c'$. Through the visual proportional relationship $a'/a=c'/c$, it may be obtained that $c'=c \times a'/a$. Since the visualization distance $a'$ between the other obstacle and the reference obstacle, the real distance $a$ between the other obstacle and the reference obstacle, and the real distance $c$ between the eyes and the reference obstacle are known, the visualization distance $c'$ between the eyes and the reference obstacle may be determined by the above formula $c'=c \times a'/a$ based on the other obstacle.

If the number of the other obstacles is at least two, the modeling unit 604 may use the at least two other obstacles as the basis to perform a weighted average calculation on obtained at least two visualization distances between the eyes and the reference obstacle, to obtain the visualization distance between the eyes and the reference obstacle.

It should be noted that since the passenger is sitting in the autonomous driving vehicle, the distance between the obstacle and the passenger's eyes may also be considered as the distance between the obstacle and the autonomous driving vehicle.

Step two, determining a position of the reference obstacle using the coordinate point of the reference obstacle in the eye coordinate system and the visualization distance between the eyes and the reference obstacle.

Here, the modeling unit 604 may determine a relative orientation relationship between the reference obstacle and the eyes using the coordinate point of the reference obstacle in the eye coordinate system. Then, the modeling unit 604 may keep the relative orientation relationship between the reference obstacle and the eyes unchanged, and translate the reference obstacle in the direction of the eyes until the distance between the reference obstacle and the eyes is the visualization distance between the reference obstacle and the eyes, and determine the position as the position of the reference obstacle.

It should be noted that after the reference obstacle is translated in the direction of the eyes, in order to ensure the relative positional relationship between the obstacles, the other obstacle also needs to be translated in the direction of the eyes accordingly.

Step three, performing three-dimensional modeling of the reference obstacle using the position of the reference obstacle.

Here, the modeling unit 604 may perform three-dimensional modeling of the reference obstacle at the position of the reference obstacle. After performing three-dimensional modeling of the reference obstacle, the modeling unit 604 may render the modeled reference obstacle.

Using this method, the visualization distance between the eyes and the reference obstacle may be obtained by comprehensive calculation through the visual proportional relationship and based on a plurality of other obstacles. Therefore, the visualization distance between the eyes and the reference obstacle may be determined more accurately and reasonably.

In some alternative implementations of the present embodiment, the determination unit 603 may select a target area from the surrounding environment as follows: the determination unit 603 may divide the surrounding environment. Generally speaking, the more areas divided, the more accurate the visualization distance determined in each area. Then, any area may be selected as the target area from the divided areas. By dividing the surrounding environment, the visualization distance between obstacles in the area may be determined for each target area that is divided, so that the visualization distance may be determined more accurately.

According to an embodiment of the present disclosure, the present disclosure further provides an electronic device and a readable storage medium.

Figure 7:
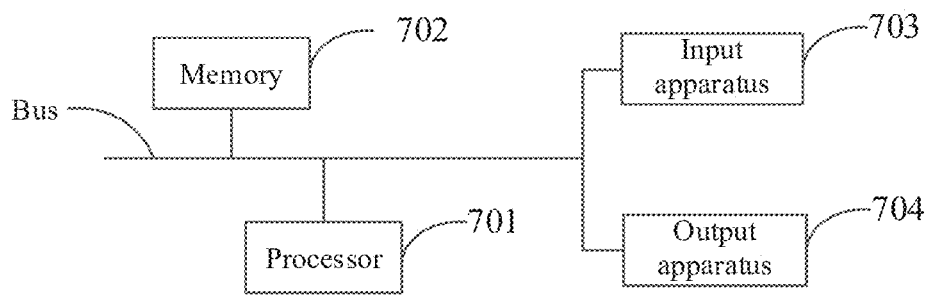
FIG. 7 is a schematic structural diagram of a computer system suitable for implementing an electronic device according to an embodiment of the present disclosure.

As shown in FIG. 7, which is a block diagram of an electronic device of a method for three-dimensional modeling according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 7701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by some embodiments of the present disclosure. The memory stores instructions executable by at least one processor, so that the at least one processor performs the method for three-dimensional modeling provided by some embodiments of the present disclosure. The non-transitory computer readable storage medium of some embodiments of the present disclosure stores computer instructions for causing a computer to perform the method for three-dimensional modeling provided by the present disclosure.

The memory 702, as a non-transitory computer readable storage medium, may be used to store non-transitory software programs, non-transitory computer executable programs and modules, such as program instructions/modules corresponding to the method for regulating a user emotion in the embodiments of the present disclosure (for example, the acquisition unit 601, establishing unit 602, determination unit 603 and modeling unit 604 shown in FIG. 6). The processor 701 executes the non-transitory software programs, instructions, and modules stored in the memory 702 to execute various functional applications and data processing of the server, that is, to implement the method for regulating a user emotion in the foregoing method embodiment.

The memory 702 may include a storage program area and a storage data area, where the storage program area may store an operating system and at least one functionality required application program; and the storage data area may store data created by the use of the electronic device according to the method for three-dimensional modeling, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for three-dimensional modeling through a network. Examples of the above network include but are not limited to the Internet, intranet, local area network, mobile communication network, and combinations thereof.

The electronic device of the method for three-dimensional modeling may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and functionality control of the electronic device of the method for three-dimensional modeling, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technology of some embodiments of the present disclosure, first acquiring coordinate points of obstacles in a surrounding environment of an autonomous driving vehicle in a vehicle coordinate system; then determining a position of eyes of a passenger in the autonomous driving vehicle, and establishing an eye coordinate system using the position of the eyes as a coordinate origin; then converting the coordinate points of the obstacles in the vehicle coordinate system to coordinate points in the eye coordinate system, and determining a visualization distance between the obstacles in the surrounding environment based on an observation angle of the eyes; and finally performing three-dimensional modeling of the surrounding environment, based on visualization distance between the coordinate points of the obstacles in the eye coordinate system and the obstacles. Using this method, the distance between the obstacles in the surrounding environment under the observation angle of the eyes may be determined, so that the surrounding environment of the autonomous driving vehicle seen by a passenger through an on-board screen is closer to the surrounding environment seen through the vehicle window.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for three-dimensional modeling, the method comprising:
acquiring coordinate points of obstacles in a surrounding environment of an autonomous driving vehicle in a vehicle coordinate system;
determining a position of eyes of a passenger in the autonomous driving vehicle, and establishing an eye coordinate system using the position of the eyes as a coordinate origin;
converting the coordinate points of the obstacles in the vehicle coordinate system to coordinate points in the eye coordinate system, and determining a visualization distance between the obstacles in the surrounding environment based on an observation angle of the eyes; and
performing three-dimensional modeling of the surrounding environment, based on visualization distance between the coordinate points of the obstacles in the eye coordinate system and the obstacles;
wherein the determining a visualization distance between the obstacles in the surrounding environment based on an observation angle of the eyes, comprises:
selecting a target area from the surrounding environment, selecting a reference obstacle from the obstacles in the target area;
generating a ray passing through a coordinate point of the reference obstacle using the coordinate origin of the eye coordinate system as a starting point; and
for each other obstacle in the target area except the reference obstacle, using a coordinate point of the other obstacle as a starting point, making a vertical line of the ray, and determining a length of the vertical line as a visualization distance between the other obstacle and the reference obstacle.

2. The method according to claim 1, wherein the performing three-dimensional modeling of the surrounding environment, based on visualization distance between the coordinate points of the obstacles in the eye coordinate system and the obstacles, comprises:
performing three-dimensional modeling of the reference obstacle based on the coordinate point of the reference obstacle in the eye coordinate system;
determining a position of the other obstacle using the visualization distance between the other obstacle except the reference obstacle in the target area and the reference obstacle; and
performing three-dimensional modeling of the other obstacle using the position of the other obstacle.

3. The method according to claim 2, wherein the performing three-dimensional modeling of the reference obstacle based on the coordinate point of the reference obstacle in the eye coordinate system, comprises:
determining a visualization distance between the eyes and the reference obstacle, based on the visualization distance between the other obstacle and the reference obstacle, a real distance between the other obstacle and the reference obstacle, and a real distance between the eyes and the reference obstacle;
determining a position of the reference obstacle using the coordinate point of the reference obstacle in the eye coordinate system and the visualization distance between the eyes and the reference obstacle; and
performing three-dimensional modeling of the reference obstacle using the position of the reference obstacle.

4. The method according to claim 1, wherein the selecting a target area from the surrounding environment, comprises:
dividing the surrounding environment to select the target area from divided areas.

5. An electronic device, comprising:
at least one processor; and
a memory, communicatively connected to the at least one processor;
wherein the memory stores instructions executable by the at least one processor, the instructions, when executed by the at least one processor, cause the at least one processor to perform operations, the operations comprising:
acquiring coordinate points of obstacles in a surrounding environment of an autonomous driving vehicle in a vehicle coordinate system;
determining a position of eyes of a passenger in the autonomous driving vehicle, and establishing an eye coordinate system using the position of the eyes as a coordinate origin;
converting the coordinate points of the obstacles in the vehicle coordinate system to coordinate points in the eye coordinate system, and determining a visualization distance between the obstacles in the surrounding environment based on an observation angle of the eyes; and
performing three-dimensional modeling of the surrounding environment, based on visualization distance between the coordinate points of the obstacles in the eye coordinate system and the obstacles;

wherein the determining a visualization distance between the obstacles in the surrounding environment based on an observation angle of the eyes, comprises:

selecting a target area from the surrounding environment, selecting a reference obstacle from the obstacles in the target area;

generating a ray passing through a coordinate point of the reference obstacle using the coordinate origin of the eye coordinate system as a starting point; and for each other obstacle in the target area except the reference obstacle, using a coordinate point of the other obstacle as a starting point, making a vertical line of the ray, and determining a length of the vertical line as a visualization distance between the other obstacle and the reference obstacle.

6. The electronic device according to claim 5, wherein the performing three-dimensional modeling of the surrounding environment, based on visualization distance between the coordinate points of the obstacles in the eye coordinate system and the obstacles, comprises:

performing three-dimensional modeling of the reference obstacle based on the coordinate point of the reference obstacle in the eye coordinate system;

determining a position of the other obstacle using the visualization distance between the other obstacle except the reference obstacle in the target area and the reference obstacle; and performing three-dimensional modeling of the other obstacle using the position of the other obstacle.

7. The electronic device according to claim 6, wherein the performing three-dimensional modeling of the reference obstacle based on the coordinate point of the reference obstacle in the eye coordinate system, comprises:

determining a visualization distance between the eyes and the reference obstacle, based on the visualization distance between the other obstacle and the reference obstacle, a real distance between the other obstacle and the reference obstacle, and a real distance between the eyes and the reference obstacle;

determining a position of the reference obstacle using the coordinate point of the reference obstacle in the eye coordinate system and the visualization distance between the eyes and the reference obstacle; and performing three-dimensional modeling of the reference obstacle using the position of the reference obstacle.

8. The electronic device according to claim 5, wherein the selecting a target area from the surrounding environment, comprises:

dividing the surrounding environment to select the target area from divided areas.

9. A non-transitory computer readable storage medium, storing computer instructions, wherein the computer instructions, when executed by a processor, cause the processor to perform operations, the operations comprising:

acquiring coordinate points of obstacles in a surrounding environment of an autonomous driving vehicle in a vehicle coordinate system;

determining a position of eyes of a passenger in the autonomous driving vehicle, and establishing an eye coordinate system using the position of the eyes as a coordinate origin;

converting the coordinate points of the obstacles in the vehicle coordinate system to coordinate points in the eye coordinate system, and determining a visualization distance between the obstacles in the surrounding environment based on an observation angle of the eyes; and performing three-dimensional modeling of the surrounding environment, based on visualization distance between the coordinate points of the obstacles in the eye coordinate system and the obstacles;

wherein the determining a visualization distance between the obstacles in the surrounding environment based on an observation angle of the eyes, comprises:

selecting a target area from the surrounding environment, selecting a reference obstacle from the obstacles in the target area;

generating a ray passing through a coordinate point of the reference obstacle using the coordinate origin of the eye coordinate system as a starting point; and for each other obstacle in the target area except the reference obstacle, using a coordinate point of the other obstacle as a starting point, making a vertical line of the ray, and determining a length of the vertical line as a visualization distance between the other obstacle and the reference obstacle.

10. The non-transitory computer readable storage medium according to claim 9, wherein the performing three-dimensional modeling of the surrounding environment, based on visualization distance between the coordinate points of the obstacles in the eye coordinate system and the obstacles, comprises:

performing three-dimensional modeling of the reference obstacle based on the coordinate point of the reference obstacle in the eye coordinate system;

determining a position of the other obstacle using the visualization distance between the other obstacle except the reference obstacle in the target area and the reference obstacle; and performing three-dimensional modeling of the other obstacle using the position of the other obstacle.

11. The non-transitory computer readable storage medium according to claim 10, wherein the performing three-dimensional modeling of the reference obstacle based on the coordinate point of the reference obstacle in the eye coordinate system, comprises:

determining a visualization distance between the eyes and the reference obstacle, based on the visualization distance between the other obstacle and the reference obstacle, a real distance between the other obstacle and the reference obstacle, and a real distance between the eyes and the reference obstacle;

determining a position of the reference obstacle using the coordinate point of the reference obstacle in the eye coordinate system and the visualization distance between the eyes and the reference obstacle; and performing three-dimensional modeling of the reference obstacle using the position of the reference obstacle.

12. The non-transitory computer readable storage medium according to claim 9, wherein the selecting a target area from the surrounding environment, comprises:

dividing the surrounding environment to select the target area from divided areas.

* * * * *